(12) United States Patent
Fan et al.

(10) Patent No.: US 9,736,711 B2
(45) Date of Patent: Aug. 15, 2017

(54) METHODS AND DEVICES FOR ADJUSTING SIGNAL STRENGTH OF ROUTER

(71) Applicant: Xiaomi Inc., Beijing (CN)

(72) Inventors: Jialin Fan, Beijing (CN); Heng Qu, Beijing (CN); Yongfeng Xia, Beijing (CN); Qiuzhi Huang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/857,278

(22) Filed: Sep. 17, 2015

(65) Prior Publication Data

US 2016/0135133 A1 May 12, 2016

Related U.S. Application Data

(63) Continuation of application No. PCT/CN2015/080683, filed on Jun. 3, 2015.

(30) Foreign Application Priority Data

Nov. 10, 2014 (CN) .......................... 2014 1 0643604

(51) Int. Cl.
H04B 17/00 (2015.01)
H04W 24/08 (2009.01)
(Continued)

(52) U.S. Cl.
CPC ......... H04W 24/08 (2013.01); H04W 52/245 (2013.01); H04W 52/343 (2013.01); H04W 52/143 (2013.01); H04W 88/02 (2013.01)

(58) Field of Classification Search
CPC .. H04W 24/00; H04W 24/08; H04B 17/0042; H04B 17/0057; H04B 2001/0416;
(Continued)

(56) References Cited

U.S. PATENT DOCUMENTS 6,449,481 B1 * 9/2002 Kwon ................... H04W 36/06
455/437
6,714,551 B1 * 3/2004 Le-Ngoc ............... H04L 1/0009
370/252

(Continued)

FOREIGN PATENT DOCUMENTS

CN 103607353 A 2/2014
CN 103619058 A 3/2014
(Continued)

OTHER PUBLICATIONS

International Search Report to PCT International Application No. PCT/CN2015/080683, dated Sep. 9, 2015, (4p).

(Continued)

Primary Examiner — Nhan Le

(57) ABSTRACT

A method and a device are provided for adjusting signal strength of a router. In the method: the device monitors a number of terminals wirelessly connected to the router during a preset time period. The device determines a signal-strength level of the router according to the number of the terminals wirelessly connected to the router during the preset time period. The device adjusts the signal strength transmitted by the router according to the signal-strength level. Through the present disclosure, a router may automatically control the signal strength transmitted by itself.

20 Claims, 4 Drawing Sheets

(51) Int. Cl.
*H04W 52/24* (2009.01)
*H04W 52/34* (2009.01)
*H04W 88/02* (2009.01)
*H04W 52/14* (2009.01)

(58) Field of Classification Search
CPC .............. H04B 17/0025; H04B 17/004; H04B 17/0062; H04B 1/1027; H04L 1/0026; H04G 3/3042; H04G 3/3047
USPC .......... 455/67.11, 67.13, 115.1–115.3, 161.1, 455/161.3, 226.1, 226.2, 418–420, 422.1
See application file for complete search history.

(56) References Cited

U.S. PATENT DOCUMENTS

| | | | |
|---|---|---|---|
| 2006/0153149 A1* | 7/2006 | Uno .................. | H04L 45/00 370/338 |
| 2009/0005043 A1* | 1/2009 | Claussen .............. | H04W 24/02 455/436 |
| 2009/0052372 A1 | 2/2009 | Durazzo et al. | |
| 2010/0238862 A1* | 9/2010 | Davidson .............. | G01S 5/0252 370/328 |
| 2014/0219243 A1 | 8/2014 | Meshkati | |

FOREIGN PATENT DOCUMENTS

| | | |
|---|---|---|
| CN | 103731911 A | 4/2014 |
| CN | 104363638 A | 2/2015 |
| JP | 2005033389 A | 2/2005 |
| JP | 2006352477 A | 12/2006 |
| JP | 2008079103 A | 4/2008 |
| JP | 2008514068 A | 5/2008 |
| KR | 10-2014-0092369 A | 7/2014 |
| KR | 10-2014-00932369 A | 8/2014 |
| RU | 2260913 C2 | 9/2005 |
| WO | 20060300056 A1 | 3/2006 |
| WO | 2013/063609 A1 | 5/2013 |

OTHER PUBLICATIONS

European Search Report issued in EP Patent Application No. 15 19 3271, mailed Dec. 16, 2015, 8 pages.
Office action issued in Korean Patent Application No. 10-2015-7020867, issued Sep. 22, 2016, 6 pages.
International Search Report issued in International Patent Application No. PCT/CN2015/080683, mailed Sep. 9, 2015, 2 pages.
Office Action (including English translation) issued in corresponding Korean Patent Application No. 10-2015-7020867, mailed Mar. 9, 2017, 9 pages.
Office Action issued in corresponding Russian Application No. 2015129677/07(045846), mailed Jan. 20, 2017, 10 pages.
Office Action issued in corresponding Japanese Application No. 2016-558261, mailed Jan. 27, 2017, 5 pages.

* cited by examiner

METHODS AND DEVICES FOR ADJUSTING SIGNAL STRENGTH OF ROUTER

CROSS-REFERENCE TO RELATED APPLICATIONS

This application is a Continuation Application of International Application No. PCT/CN2015/080683, filed Jun. 3, 2015, which is based upon and claims priority to Chinese Patent Application No. CN201410643604.8, filed Nov. 10, 2014, the entire contents of which are incorporated herein by reference.

TECHNICAL FIELD

The present disclosure generally relates to the field of wireless telecommunication technology, and more particularly, to a method and a device for adjusting signal strength of a router.

BACKGROUND

In the related art, a wireless router inside a room conventionally transmits signals with a fixed power. Alternatively, it may be set to three levels of signal strength: "through wall," "standard," or "energy saving." Once a user sets the signal strength of the router, the router will transmit signals according to the signal strength that has been set.

However, the signal strength transmitted by the router may not be dynamically adjusted according to the number of users and network traffic. If the signal strength transmitted by the router is too high while there is no user accessing wireless network, it will cause waste in power consumption of the router; and if the signal strength transmitted by the router is too low while there are too many terminals accessing wireless network or a user is watching video or performing an upload or download task, it will cause congestion in network and thus present a poor network surfing experience for the user.

SUMMARY

According to a first aspect of embodiments of the present disclosure, there is provided a method for adjusting signal strength of a router. The method includes: monitoring a number of terminals wirelessly connected to the router during a preset time period; determining a signal-strength level of the router according to the number of the terminals wirelessly connected to the router during the preset time period; and adjusting the signal strength transmitted by the router according to the signal-strength level.

According to a second aspect of embodiments of the present disclosure, there is provided a device for adjusting signal strength of a router, including: a processor; and a memory for storing instructions executable by the processor; wherein the processor is configured to perform: monitoring a number of terminals wirelessly connected to the router during a preset time period; determining a signal-strength level of the router according to the number of the terminals wirelessly connected to the router during the preset time period; and adjusting the signal strength transmitted by the router according to the signal-strength level.

According to a third aspect of embodiments of the present disclosure, there is provided a non-transitory computer-readable storage medium storing instructions that, when executed by a processor of a router, cause the router to perform acts. The acts include: monitoring a number of terminals wirelessly connected to the router during a preset time period; determining a signal-strength level of the router according to the number of the terminals wirelessly connected to the router during the preset time period; and adjusting the signal strength transmitted by the router according to the signal-strength level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Figure 1:
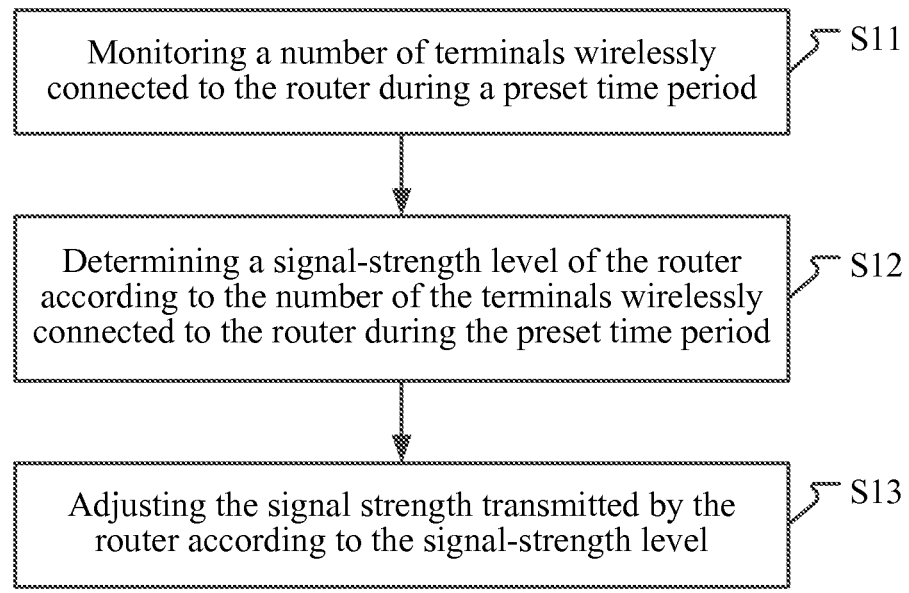
FIG. 1 is a flow chart of a method for adjusting signal strength of a router according to an exemplary embodiment.

FIG. 1 is a flow chart of a method for adjusting signal strength of a router according to an exemplary embodiment. As shown in FIG. 1, the method for adjusting signal strength of a router may be implemented in a router. The router may be used for users to access wireless networks at home. The method may include the following steps.

In step S11, the number of terminals wirelessly connected to the router during a preset time period is monitored. The preset time period may be set by an administrator of the router using a terminal. For example, the preset time period may also be referred as the first preset time period which may have a default value of 10 or 60 minutes. The router may monitor the number of connected terminals when each new terminal is connected to the router. Alternatively or additionally, the router may update the number of connected terminals based on a second preset time period, for example, every 5 minutes or every 30 minutes. The second preset time period may be set by the administrator of the router using a smart phone or other types of terminals. The second preset time period may also be set based on the preset time period. For example, the second preset time period may be set to about a half of the preset time period.

In step S12, a signal-strength level of the router is determined according to the number of the terminals wirelessly connected to the router during the preset time period. The router may have preset signal-strength levels, which may also be customized by the user using a smart phone or other types of terminals.

In step S13, the signal strength transmitted by the router is adjusted according to the signal-strength level.

For example, an option may be added to a setting menu of the router, to allow the WIFI signal strength of the router to be set to an "automatic" mode, i.e. the router automatically adjusts the signal strength. Alternatively or additionally, the router may send a message to the administrator's terminal to confirm whether to adjust the signal-strength level and then act according to the feedback from the administrator's terminal.

In the embodiments, the router adjusts wireless signal strength according to the number of terminals currently connected. If a large number of terminals are connected, that is, a large number of user devices are accessing wireless network, the wireless signal strength transmitted by the router may be increased, to allow the user to access the network smoothly, and to improve the network surfing experience for the user. If a small number of terminals are connected, that is, a small number of user devices are accessing the wireless network, the wireless signal strength transmitted by the router may be decreased, to decrease the power consumption of the router and save energy.

Figure 2:
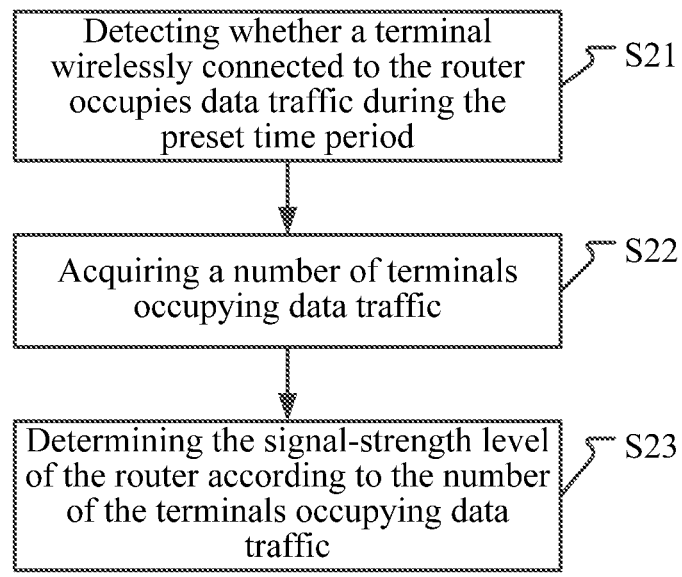
FIG. 2 is a flow chart of a method for adjusting signal strength of a router according to another exemplary embodiment.

FIG. 2 is a flow chart of a method for adjusting signal strength of a router according to one or more exemplary embodiments. As shown in FIG. 2, optionally, the above step S12 includes the following steps.

In step S21, it is detected whether a terminal wirelessly connected to the router occupies data traffic during the preset time period. The router may monitor the data traffic for each connected terminal device in a log file.

For example, the number of terminals connected to the router is 10, however, 5 of the terminals do not occupy data traffic.

In step S22, the router may then acquire the number of terminals occupying data traffic.

In step S23, the signal-strength level of the router is determined according to the number of the terminals occupying data traffic.

For example, it may be set to three levels of signal strength: "through wall," "standard," or "energy saving." At night, after the user goes to bed, all the computers connected to the router are shut down, and all the mobile phones are in a screen locked state, that is, none of the terminals occupies data traffic. At this time, the signal-strength level of the router may be adjusted to a minimum level such as "energy saving." In the morning, after the user gets up, turns on the computers or mobile phones to access network, one or more terminals connected to the router begin to occupy data traffic. At this time, the router may adjusts the signal-strength level of the router to "standard."

Alternatively or additionally, the router may adjust signal strength of the router when there are terminals connected to the router but without accessing the network. If there are too many terminals connected to the router but not accessing the network, it may cause the router to remain a relatively high level of signal strength, resulting in waste of power consumption of the router. Therefore, the router may exclude such terminals when adjusting the signal strength thereof according to the number of terminals. Thus, the adjusting of the signal strength of the router may be more accurate, to reduce the power consumption of the router and save energy.

Figure 3:
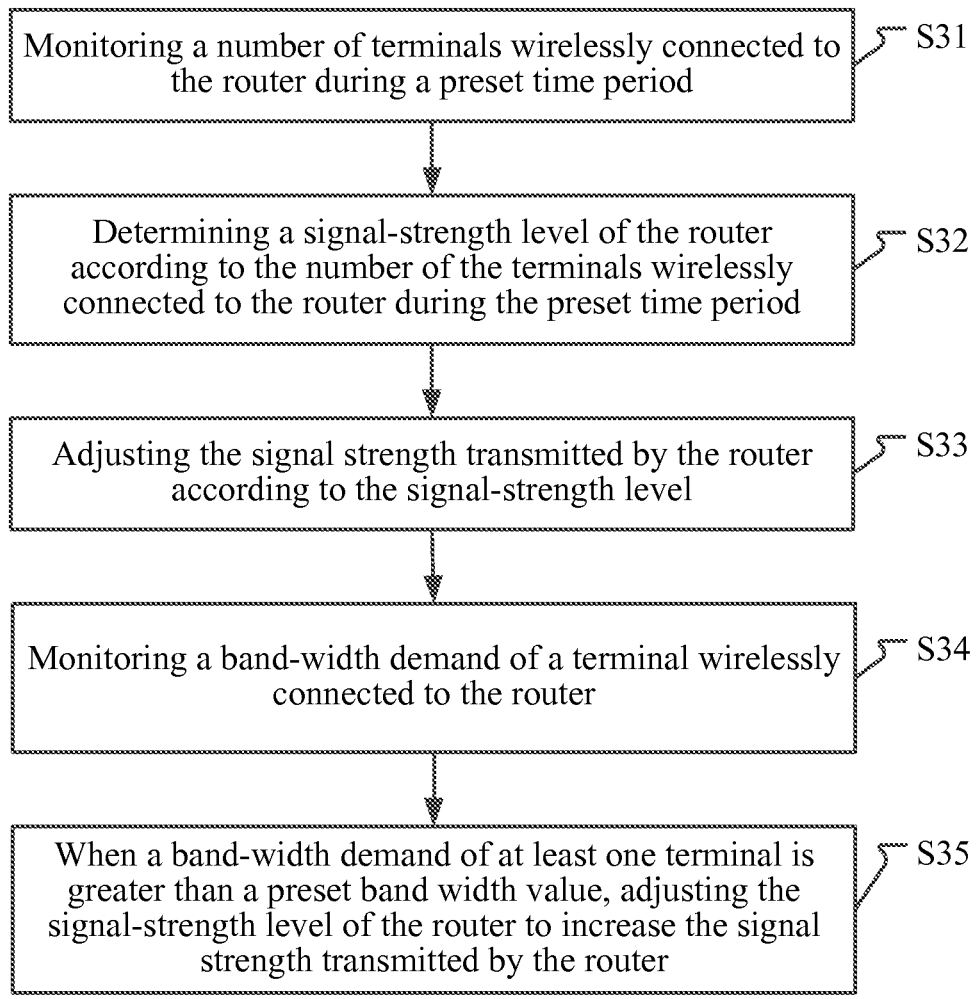
FIG. 3 is a flow chart of a method for adjusting signal strength of a router according to another exemplary embodiment.

FIG. 3 is a flow chart of a method for adjusting signal strength of a router according to one or more exemplary embodiments. is the method may be implemented at least partially in a router. As shown in FIG. 3, the method includes the following steps.

In step S31, the number of terminals wirelessly connected to the router during a preset time period is monitored.

For example, when a terminal is connected to the router, the router may record information such as a MAC address of the terminal. Alternatively or additionally, the router may periodically read a list of terminals connected to the router.

In step S32, a signal-strength level of the router is determined according to the number of the terminals wirelessly connected to the router during the preset time period.

For example, the signal-strength level may be increased as the number of the terminals connected to the terminal increases. Similarly, the signal-strength level may be decreased as the number of the terminals connected to the terminal decreases.

In step S33, the signal strength transmitted by the router is adjusted according to the signal-strength level. The router may adjust the transmitting signal strength when the signal-strength level is changed.

In step S34, a band-width demand of a terminal wirelessly connected to the router is monitored.

In order to learn demand of the signal strength more accurately, the band-width demands of the terminals may be further learned.

In step S35, when a band-width demand of at least one terminal is greater than a preset band width value, the signal-strength level of the router is adjusted to increase the signal strength transmitted by the router.

Alternatively or additionally, the router may determine whether to increase the signal strength transmitted by the router according to band-width demands of the terminals connected to the router. When a certain terminal wirelessly connected to the router has a band-width demand increased to exceed the preset band width value, for example, the terminal is being used to watch video, perform upload or download, no matter there are how many terminals connected to the router currently, the signal strength of the router may be increased, to allow the user to access the network smoothly, and to improve the network surfing experience for the user.

For example, the signal-strength level of the router may include a plurality of preset levels, which may be customized by the administrator of the router. The router may have a default factory setup, which may include three levels in an order from a lower level to a higher level, a first signal-strength level, a second signal-strength level, and a third signal-strength level.

The router may determine a signal-strength level of the router according to the number of the terminals wirelessly connected to the router during the preset time period using acts including:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

For example, the router may be generally set to three levels of signal strength: "through wall," "standard," or "energy saving."

When the number of terminals connected to the router is 0 within 1 minute, the WIFI signal strength of the router may be adjusted to "energy saving."

When the number of terminals connected to the router is greater than 0 and less than 4 within 1 minute, the WIFI signal strength of the router may be adjusted to "standard."

When the number of terminals connected to the router is greater than or equal to 4 within 1 minute, the WIFI signal strength of the router may be adjusted to "through wall."

Alternatively or additionally, when a band-width demand of at least one terminal is greater than the preset band width value, the signal-strength level of the router is determined as the third signal-strength level.

For example, when there is a terminal being used to watch video or perform upload or download, the WIFI signal strength of the router may be adjusted to "through wall", to allow the user to access the network smoothly, and to improve the network surfing experience for the user.

In the embodiments, the router may adjust wireless signal strength according to the number of terminals currently connected. If a large number of terminals are connected, that is, a large number of user devices are accessing wireless network, the wireless signal strength transmitted by the router may be increased, to allow the user to access the network smoothly, and to improve the network surfing experience for the user. If a small number of terminals are connected, that is, a small number of user devices are accessing the wireless network, the wireless signal strength transmitted by the router may be decreased, to decrease the power consumption of the router and save energy.

Figure 4:
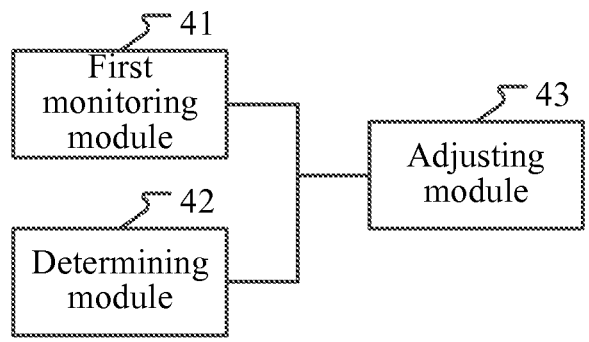
FIG. 4 is a block diagram of a device for adjusting signal strength of a router according to an exemplary embodiment.

FIG. 4 is a block diagram of a device for adjusting signal strength of a router according to an exemplary embodiment. The device may include circuitries such as a chip set, a hardware processor, a print circuit board, etc. As shown in FIG. 4, the device includes a first monitoring module 41, a determining module 42 and an adjusting module 43. The modules may be implemented using one or more circuitries.

The first monitoring module 41 is configured to monitor a number of terminals wirelessly connected to the router during a preset time period.

The determining module 42 is configured to determine a signal-strength level of the router according to the number of the terminals wirelessly connected to the router during the preset time period.

The adjusting module 43 is configured to adjust the signal strength transmitted by the router according to the signal-strength level.

Figure 5:
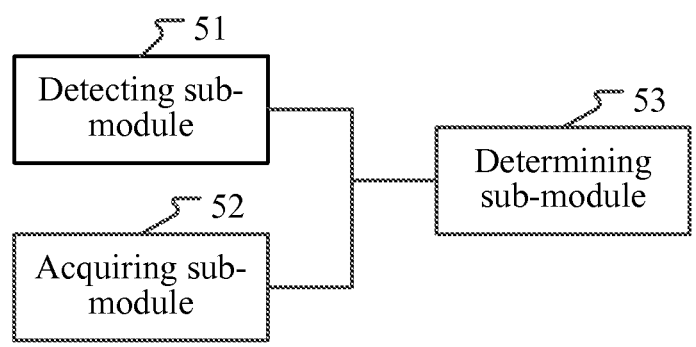
FIG. 5 is a block diagram of a determining module according to another exemplary embodiment.

FIG. 5 is a block diagram of a determining module according to an exemplary embodiment. As shown in FIG. 5, the determining module 42 may include: a detecting sub-module 51, an acquiring sub-module 52, and a determining sub-module 53. The detecting sub-module 51 is configured to detect whether a terminal wirelessly connected to the router occupies data traffic during the preset time period. The acquiring sub-module 52 is configured to acquire a number of terminals occupying data traffic.

The determining sub-module 53 is configured to determine the signal-strength level of the router according to the number of the terminals occupying data traffic.

Figure 6:
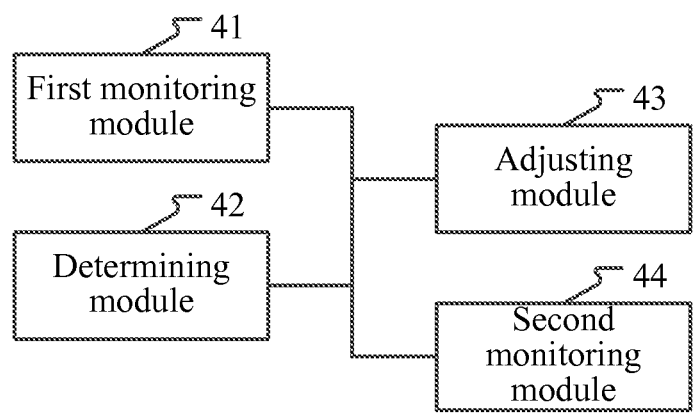
FIG. 6 is a block diagram of a device for adjusting signal strength of a router according to another exemplary embodiment.

FIG. 6 is a block diagram of a device for adjusting signal strength of a router according to another exemplary embodiment. As shown in FIG. 6, the device may further include: a determining module 42 a second monitoring module 44. The second monitoring module 44 is configured to monitor a band-width demand of a terminal wirelessly connected to the router. The determining module 42 is configured to, when a band-width demand of at least one terminal is greater than a preset band width value, determine to adjust the signal-strength level of the router to increase the signal strength transmitted by the router.

Optionally, the signal-strength level of the router includes, in an order from a lower level to a higher level, a first signal-strength level, a second signal-strength level and a third signal-strength level.

Alternatively or additionally, the determining module 42 is configure to: when the number of the terminals wirelessly connected to the router during the preset time period is less than or equal to a first preset value, determine the signal-strength level of the router as the first signal-strength level; when the number of the terminals wirelessly connected to the router during the preset time period is greater than the first preset value and less than a second preset value, determine the signal-strength level of the router as the second signal-strength level; and when the number of the terminals wirelessly connected to the router during the preset time period is greater than or equal to the second preset value, determine the signal-strength level of the router as the third signal-strength level.

Optionally, the determining module 42 is configured to, when a band-width demand of at least one terminal is greater than the preset band width value, determine the signal-strength level of the router as the third signal-strength level.

With respect to the device in the above embodiments, specific operations performed by each modules have been described in detail in the related method embodiments, and detailed description thereof are omitted herein.

The present disclosure also provides a device for adjusting signal strength of a router, including: a processor; and a memory for storing instructions executable by the processor.

The processor is configured to perform acts including: monitoring a number of terminals wirelessly connected to the router during a preset time period; determining a signal-strength level of the router according to the number of the terminals wirelessly connected to the router during the preset time period; and adjusting the signal strength transmitted by the router according to the signal-strength level.

Figure 7:
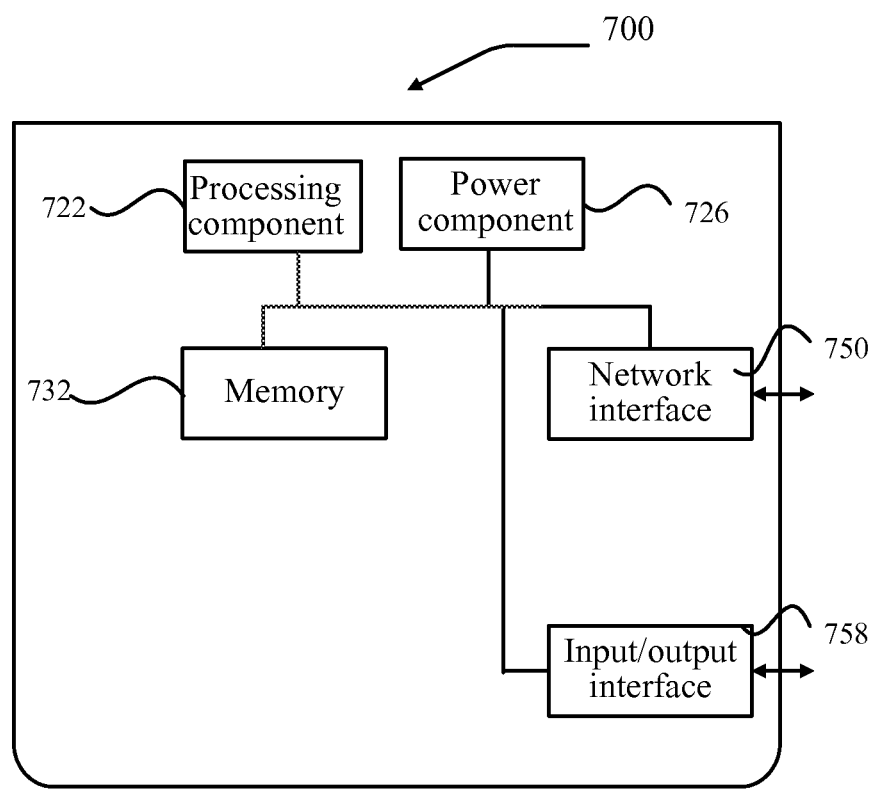
FIG. 7 is a block diagram of a device for adjusting signal strength of a router according to an exemplary embodiment.

FIG. 7 is a block diagram of a device 700 for adjusting signal strength of a router according to an exemplary embodiment. For example, the device 700 may be a router. The device 700 may be implemented by a router or a server. Referring to FIG. 7, the device 700 may include a processing component 722, which further includes one or more processors and a storage resource represented by a memory 732 for storing instructions such as an application program executable by the processing component 722. The application program stored in the memory 732 may include one or more modules each corresponding to a set of instructions. In addition, the processing component 722 is configured to execute instructions to perform the above methods.

The device 700 further includes a power component 726 configured to perform power management for the device 700, a wired or wireless network interface 750 configured to connect the device 700 to network, and an input/output (I/O) interface 758. The device 700 may be operated based on an operating system such as Windows Server™, Mac OS X™, Unix™, Linux™, FreeBSD™, or the like stored in the memory 732.

In the embodiments, the device 700 may be implemented by circuitries including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods. The components, units, subunit, modules, and sub-modules may be implemented by the one or more circuitries.

In an exemplary embodiment, there is also provided a non-transitory computer-readable storage medium including instructions, such as included in the memory, executable by the processor in the device, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, when instructions in the storage medium are executed by a processor of a router, the router is enabled to perform the method for adjusting signal strength of a router. The method includes: monitoring a number of terminals wirelessly connected to the router during a preset time period; determining a signal-strength level of the router according to the number of the terminals wirelessly connected to the router during the preset time period; and adjusting the signal strength transmitted by the router according to the signal-strength level.

Optionally, the determining a signal-strength level of the router according to the number of the terminals wirelessly connected to the router during the preset time period, includes: detecting whether a terminal wirelessly connected to the router occupies data traffic during the preset time period; acquiring a number of terminals occupying data traffic; and determining the signal-strength level of the router according to the number of the terminals occupying data traffic.

Optionally, the method may further include: monitoring a band-width demand of a terminal wirelessly connected to the router; when a band-width demand of at least one terminal is greater than a preset band width value, adjusting the signal-strength level of the router to increase the signal strength transmitted by the router. Through the present disclosure, a router may automatically control its transmitting signal strength dynamically.

Optionally, the signal-strength level of the router includes, in an order from a lower level to a higher level, a first signal-strength level, a second signal-strength level and a third signal-strength level; and the determining a signal-strength level of the router according to the number of the terminals wirelessly connected to the router during the preset time period includes: when the number of the terminals wirelessly connected to the router during the preset time period is less than or equal to a first preset value, determining the signal-strength level of the router as the first signal-strength level; when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

Optionally, when a band-width demand of at least one terminal is greater than the preset band width value, the signal-strength level of the router is determined as the third signal-strength level.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adjusting signal strength of a router, comprising:
   monitoring, by the router, a number of terminals wirelessly connected to the router during a preset time period;
   determining, by the router, a signal-strength level of the router according to the number of the terminals wirelessly connected to the router during the preset time period; and
   adjusting, by the router, the signal strength transmitted by the router according to the signal-strength level,
   wherein determining the signal-strength level of the router according to the number of the terminals wirelessly connected to the router during the preset time period comprises:
   acquiring a number of terminals occupying data traffic; and
   determining the signal-strength level of the router according to the number of the terminals occupying data traffic.

2. The method according to claim 1, wherein determining the signal-strength level of the router according to the number of the terminals wirelessly connected to the router during the preset time period comprises:
   detecting whether a terminal wirelessly connected to the router occupies data traffic during the preset time period.

3. The method according to claim 1, further comprising:
   monitoring a band-width demand of a terminal wirelessly connected to the router; and
   adjusting the signal-strength level of the router to increase the signal strength transmitted by the router when the band-width demand of is greater than a preset band width value.

4. The method according to claim 1, wherein the signal-strength level of the router comprises, in an order from a lower level to a higher level, a first signal-strength level, a second signal-strength level and a third signal-strength level; and wherein determining a signal-strength level of the router according to the number of the terminals wirelessly connected to the router during the preset time period, comprises:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

5. The method according to claim 2, wherein the signal-strength level of the router comprises: a first signal-strength level, a second signal-strength level and a third signal-strength level; and wherein determining a signal-strength level of the router according to the number of the terminals wirelessly connected to the router during the preset time period, comprises:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

6. The method according to claim 3, wherein the signal-strength level of the router comprises: a first signal-strength level, a second signal-strength level and a third signal-strength level; and wherein determining a signal-strength level of the router according to the number of the terminals wirelessly connected to the router during the preset time period, comprises:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

7. The method according to claim 4, wherein when a band-width demand of at least one terminal is greater than a preset band width value, the signal-strength level of the router is determined as the third signal-strength level.

8. The method according to claim 5, wherein when a band-width demand of at least one terminal is greater than a preset band width value, the signal-strength level of the router is determined as the third signal-strength level.

9. The method according to claim 6, wherein when a band-width demand of at least one terminal is greater than the preset band width value, the signal-strength level of the router is determined as the third signal-strength level.

10. A device for adjusting signal strength of a router, comprising:

a processor; and a memory for storing instructions executable by the processor;

wherein the processor is configured to perform:

monitoring a number of terminals wirelessly connected to the router during a preset time period;

determining a signal-strength level of the router according to the number of the terminals wirelessly connected to the router during the preset time period; and adjusting the signal strength transmitted by the router according to the signal-strength level, wherein determining the signal-strength level of the router according to the number of the terminals wirelessly connected to the router during the preset time period comprises:

acquiring a number of terminals occupying data traffic; and determining the signal-strength level of the router according to the number of the terminals occupying data traffic.

11. The device according to claim 10, wherein determining the signal-strength level of the router according to the number of the terminals wirelessly connected to the router during the preset time period comprises:

detecting whether a terminal wirelessly connected to the router occupies data traffic during the preset time period.

12. The device according to claim 10, wherein the processor is further configured to perform:

monitoring a band-width demand of a terminal wirelessly connected to the router;

when a band-width demand of at least one terminal is greater than a preset band width value, adjusting the signal-strength level of the router to increase the signal strength transmitted by the router.

13. The device according to claim 10, wherein the signal-strength level of the router comprises: a first signal-strength level, a second signal-strength level and a third signal-strength level; and wherein determining a signal-strength level of the router according to the number of the terminals wirelessly connected to the router during the preset time period, comprises:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

14. The device according to claim 11, wherein the signal-strength level of the router comprises: a first signal-strength level, a second signal-strength level and a third signal-strength level; and wherein determining a signal-strength level of the router according to the number of the terminals wirelessly connected to the router during the preset time period, comprises:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

15. The device according to claim 12, wherein, the signal-strength level of the router comprises: a first signal-strength level, a second signal-strength level and a third signal-strength level; and wherein determining a signal-strength level of the router according to the number of the terminals wirelessly connected to the router during the preset time period, comprises:

when the number of the terminals wirelessly connected to the router during the preset time period is less than or equal to a first preset value, determining the signal-strength level of the router as the first signal-strength level;

when the number of the terminals wirelessly connected to the router during the preset time period is greater than the first preset value and less than a second preset value, determining the signal-strength level of the router as the second signal-strength level; and when the number of the terminals wirelessly connected to the router during the preset time period is greater than or equal to the second preset value, determining the signal-strength level of the router as the third signal-strength level.

16. The device according to claim 13, wherein when a band-width demand of at least one terminal is greater than a preset band width value, the device determines that the signal-strength level of the router is the third signal-strength level.

17. The device according to claim 14, wherein when a band-width demand of at least one terminal is greater than a preset band width value, the device determines that the signal-strength level of the router is the third signal-strength level.

18. The device according to claim 15, wherein when a band-width demand of at least one terminal is greater than the preset band width value, the device determines that the signal-strength level of the router is the third signal-strength level.

19. A non-transitory computer-readable storage medium storing instructions that, when executed by a processor of a router, cause the router to perform:

monitoring a number of terminals wirelessly connected to the router during a preset time period;

determining a signal-strength level of the router according to the number of the terminals wirelessly connected to the router during the preset time period; and adjusting the signal strength transmitted by the router according to the signal-strength level, wherein determining the signal-strength level of the router according to the number of the terminals wirelessly connected to the router during the preset time period comprises:

acquiring a number of terminals occupying data traffic; and determining the signal-strength level of the router according to the number of the terminals occupying data traffic.

20. The non-transitory computer-readable storage medium according to claim 19, wherein determining the signal-strength level of the router according to the number of the terminals wirelessly connected to the router during the preset time period comprises:

detecting whether a terminal wirelessly connected to the router occupies data traffic during the preset time period.

* * * * *